(12) United States Patent
Nelson

(10) Patent No.: US 7,349,779 B2
(45) Date of Patent: Mar. 25, 2008

(54) AUTOMATIC STEERING SYSTEM

(75) Inventor: Frederick William Nelson, Waukee, IA (US)

(73) Assignee: Deere & Company, Moline, IL (US)

( * ) Notice: Subject to any disclaimer, the term of this patent is extended or adjusted under 35 U.S.C. 154(b) by 645 days.

(21) Appl. No.: 11/019,482

(22) Filed: Dec. 21, 2004

(65) Prior Publication Data

US 2006/0149446 A1  Jul. 6, 2006

(51) Int. Cl.
*A01B 69/00* (2006.01)
(52) U.S. Cl. .......................................... 701/41; 701/50
(58) Field of Classification Search ................... 701/1, 701/36, 41, 42, 43, 50; 180/401, 402, 400, 180/441, 442, 443, 444
See application file for complete search history.

(56) References Cited

U.S. PATENT DOCUMENTS

| | | | | |
|---|---|---|---|---|
| 4,967,362 A | | 10/1990 | Schutten et al. ........ | 364/424.07 |
| 5,234,070 A | | 8/1993 | Noah et al. ................. | 180/169 |
| 6,101,795 A | * | 8/2000 | Diekhans ................. | 56/10.2 F |
| 6,397,569 B1 | * | 6/2002 | Homburg et al. ......... | 56/10.2 F |
| 6,581,717 B1 | * | 6/2003 | Sørensen et al. ........... | 180/401 |

OTHER PUBLICATIONS

Article titled "Trimble Transforms Lightbar Guidance into Assisted or Automated Steering for Agriculture Applications", Dec. 1, 2004.
SAE The Engineering Society For Advancing Mobility Land Sea Air and Space, SAE Technical Paper Series, 891840, Applying Farm Chemicals with a Truck Outfitted with Electronic Navigation. p. 3 Author: R. J. Palmer, Engineering University of Regina, Regina, Sask. Canada.
EZ-Steer System—Affordable Assisted Steering, Ag Leader Technology, Inc.

* cited by examiner

*Primary Examiner*—Richard M. Camby

(57) ABSTRACT

Structure for converting a conventional manual steering system of an off-road vehicle to an automatic steering system utilizing remote signals. A stepper motor is connected through a belt or chain drive to a drive mounted on the upper end of a steering shaft. The stepper motor is connected to a microprocessor and moves with the steering shaft in both a manual steering mode and an automatic steering mode. An encoder provides a signal to a microprocessor that changes operation to the manual mode if the number of steps reported by the encoder is different than what is expected. An assembly including alternate steering wheel, shaft pulley, adapter insert and stepper motor is easily connected to the steering column. A drive motor may also be directly connected to the steering shaft.

22 Claims, 4 Drawing Sheets

AUTOMATIC STEERING SYSTEM

FIELD OF THE INVENTION

The present invention relates generally to automatic steering systems for vehicles and more, specifically, to automatic systems adaptable to a wide range of off-road vehicles with different steering mechanisms.

BACKGROUND OF THE INVENTION

Current automatic steering systems for off-road vehicles, such as the commercially available John Deere GreenStar™ Auto Trac assisted steering system for tractors, typically require an auxiliary electro hydraulic steering control system to interact with the steering system on the vehicle. A combination of GPS system signals and signals from onboard sensors are processed to provide automatic guidance of the vehicle. An electro hydraulic valve, a steered wheel angle sensor, and steering wheel movement sensor for operator override are required to control interaction of the manual system with the automatic system. Such an automatic system takes many hours to install and requires knowledge of the steering, hydraulic, and electrical systems on the vehicle. The automatic system must be specifically adapted to the particular steering system on the vehicle. Use of the system may be limited on some vehicles, such as those with dual-path hydrostatic steering. Some types of automatic steering systems, such as shown in U.S. Pat. No. 5,234,070, require a special clutch that is disengaged during one of the steering modes. Many systems require a separate steered wheel angle sensor.

In another type of system, an electric motor with a friction drive engaging the steering wheel is supported from the steering column. Such an add-on type of unit often does not integrate well into the system, and the open friction drive arrangement presents pinch points and is subject to wear in both the friction drive and at the steering wheel. Any slip in the drive can cause instability in the steering system and adversely affect steering accuracy. The system also lacks inertial measurements or real time kinematics (RTK) features for accuracies often demanded in automatic steering applications.

There is a need for a simpler, less expensive and more easily installed automatic steering system that minimizes or eliminates substantial steering system modifications and special clutches. There is a further need for such a system which is more accurate and reliable than at least most previously available retrofit sytems and better integrates, both functionally and aesthetically, into most existing steering mechanisms.

SUMMARY OF THE INVENTION

Structure for converting a conventional manual steering system of an off-road vehicle to an automatic steering system utilizing remote signals. A stepper motor is connected through a chain or belt drive to a drive sprocket or pulley mounted on the steering shaft. The stepper motor is connected to a microprocessor and moves with the steering shaft in both a manual steering mode and an automatic steering mode. An encoder provides a signal to a microprocessor that changes operation to the manual mode if the number of steps reported by the encoder is different than what is expected. An assembly including alternate steering wheel, shaft pulley and stepper motor is easily connected to the steering column and integrates well, both functionally and aesthetically, into many off-road vehicles. Locating the drive structure near the uppermost end of the steering shaft facilitates convenient mounting of the structure. Inserts are provided with the assembly for adapting the particular steering shaft configuration to the drive sprocket or pulley. In another embodiment, the motor can be mounted directly on the shaft end without an additional drive.

The steering structure can be mounted on a wide range of vehicles having various types of hydraulic or mechanically assisted steering systems. Steered wheel angle sensors and sensors dedicated to determining whether or not the operator has manually moved the steering wheel are not required. The steering wheel position signal from the encoder provides steered angle feedback without need of additional sensors and is useful in control algorithms to improve performance, reliability, and stability of the vehicle. In an embodiment, terrain compensation signals are provided to the processor to further enhance steering performance. A further enhancement includes provision of a steering system electronic unit with the encoder directly on the motor to allow the system to be easily connected into the controller area network (CAN) harness of the vehicle with a minimum amount of hardware.

These and other objects, features and advantages of the present invention will become apparent upon reading the following detailed description in view of the drawings.

DESCRIPTION OF THE PREFERRED EMBODIMENT

Figure 1:
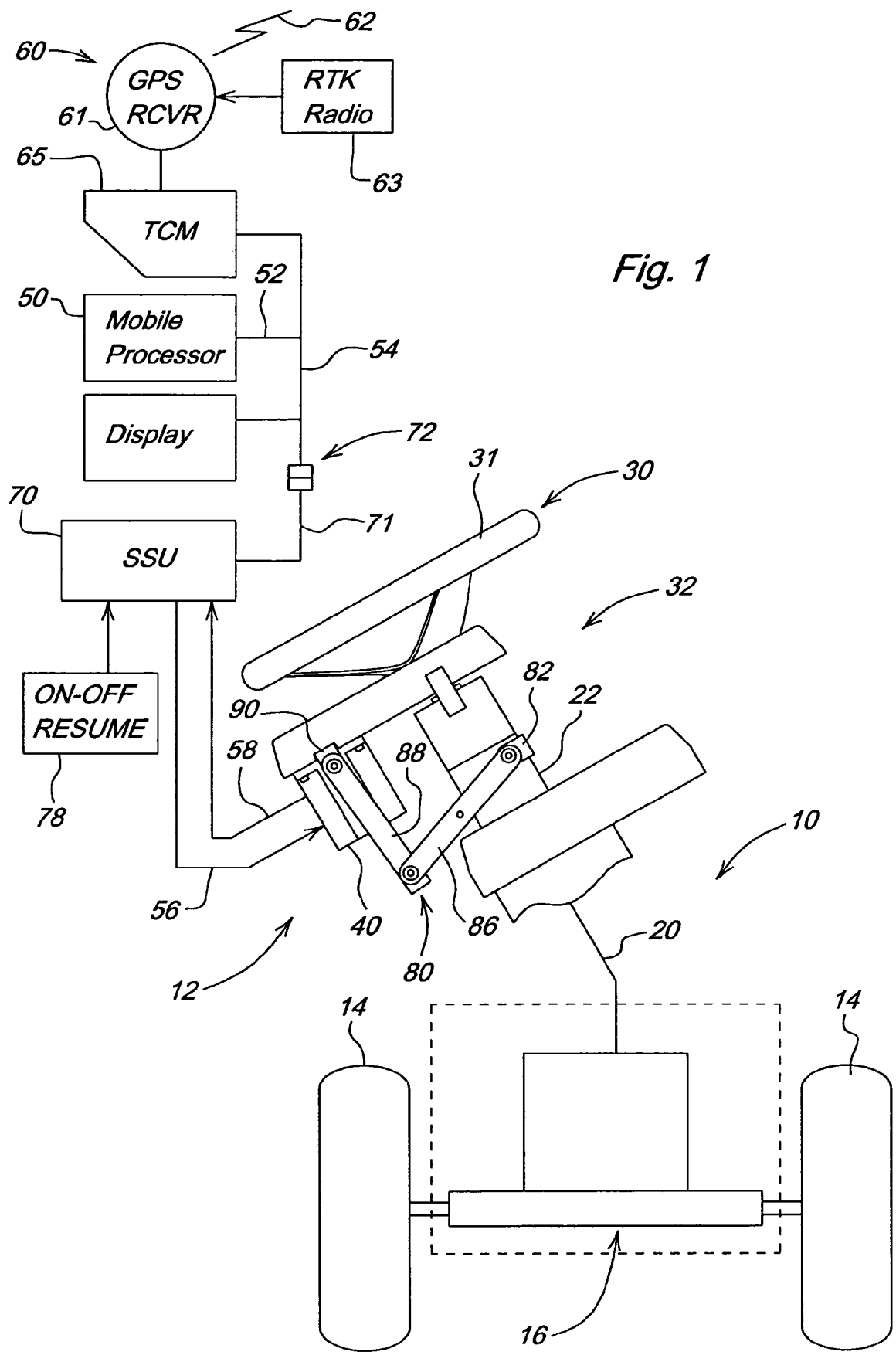
FIG. 1 is a schematic representation of steering structure for converting manual steering system to an automatic system.
Figure 2:
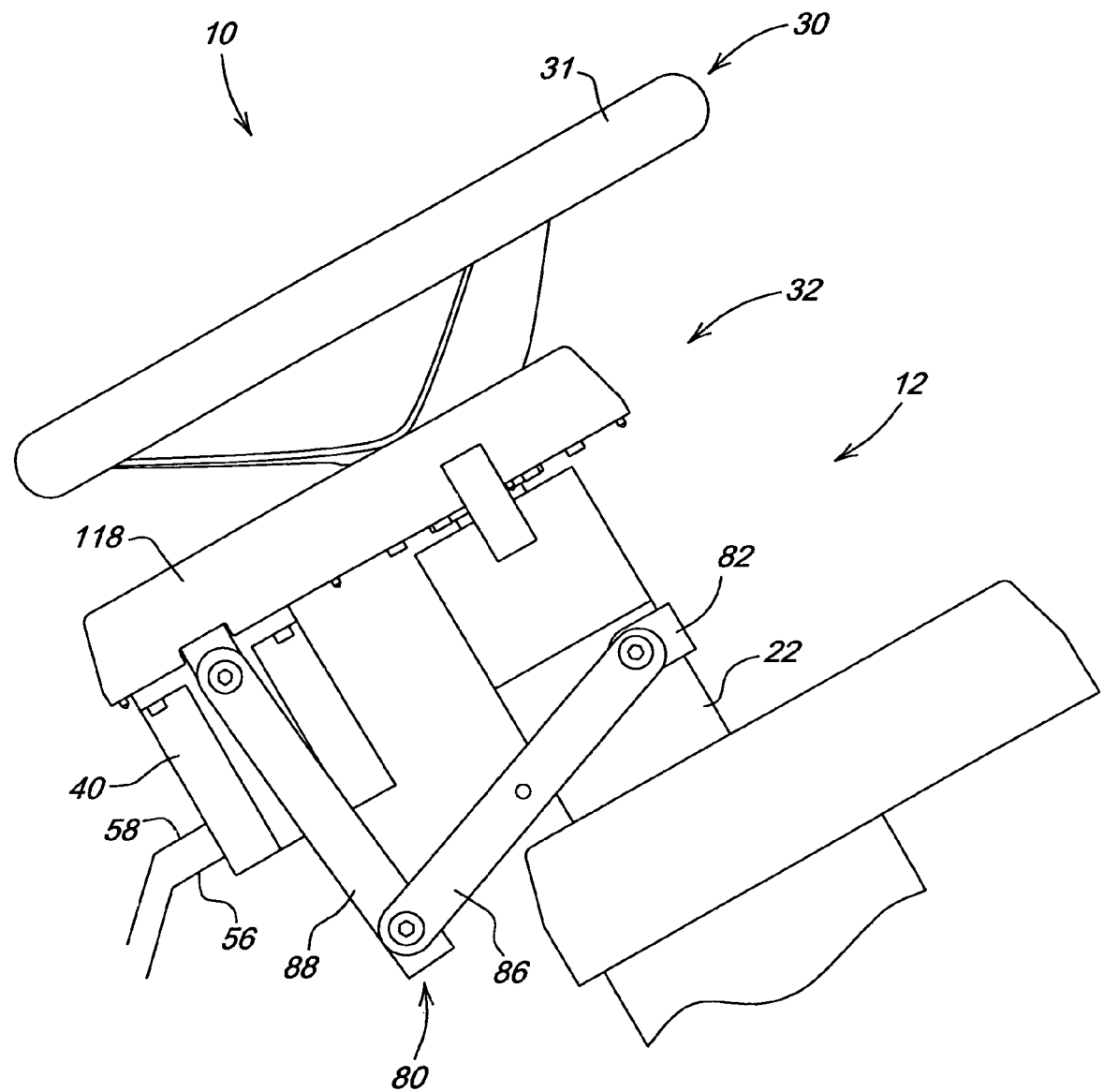
FIG. 2 is a side view of the steering structure and mounting assembly.

Referring now to FIG. 1, therein is shown an off-road vehicle 10 such as a tractor or utility vehicle having an operator station 12 supported for movement over the ground by steerable wheels 14. The wheels 14 are connected to a conventional steering mechanism 16 which includes a rotatable steering shaft 20 supported within a steering column 22 which projects upwardly at the operator station 12. A steering wheel 30 with a hand grip portion 31 is supported at the upper end of the shaft 20 for manual steering operation by the operator.

As shown, the steering wheel 30 is part of conversion structure indicated generally at 32 for providing an automatic steering function on a vehicle normally equipped with manual steering only. Alternatively, the original steering wheel of the vehicle may be mounted on the conversion structure 32. Pulley structure 34 is connected for rotation with the shaft 20 about the shaft axis at a location adjacent the connection of the steering wheel 30 with the shaft 20. A motor 40 is supported from the column 22. Pulley structure 44 drivingly connecting the motor 40 to the pulley structure 34. As shown, the pulley structures 34 and 44 are pulleys connected by a chain, conventional drive belt or timing belt arrangement 46. However, other types of drives such as gear drives may also be used. Also, as shown in the embodiment shown in FIG. 4, a motor 40' may be mounted on the end of the steering shaft 20 to provide direct drive to the shaft 20 at a location offset from hand grip portion 31.

A mobile processor 50 is located on the vehicle 10 and includes a control output 52 connected through a CAN harness 54 to an input 56 of the motor 40. A position feedback output 58 on the motor 40 is connected to an input of the processor 50. As shown, the motor 40 is an electric stepper motor, and the feedback device is an encoder located on the motor 40 and providing signal over a feedback line 58 indicative of the number of steps the motor 40 has moved. The motor 40 remains drivingly connected to the steering shaft 20 in both a manual steering mode and an automatic steering mode so that the encoder is capable of providing a shaft position signal to the processor 50 in both modes.

The processor 50 is connected to position sensor structure indicated generally at 60 in FIG. 1, such as a conventional global positioning system (GPS) with a receiver 61 that receives signals 62 from one or more remote locations. Additional correction inputs such as a RTK ground based differential correction input may be provided from an RTK radio 63, and a terrain compensation input may be provided from a terrain compensation module (TCM) 65. The TCM 65 corrects GPS data for roll angle and yaw as the vehicle 10 moves over uneven terrain.

The system 60 is connected through CAN 54 to an input of the processor 50. A steering system unit (SSU) 70 is connected through a CAN harness 71 and a system connector 72 to the CAN harness 54. The SSU 70 receives control information from the mobile processor 50 and position feedback information via line 58 from the encoder on the motor 50. An on-off and resume switch 78 is connected to the SSU 70.

The processor 50 determines the position of the vehicle and compares the position to a desired position and intended path of the vehicle. An error signal is generated, and the motor 40 is activated to move a preselected number of steps depending on the error signal. Detection devices, such as a ground speed detector and lateral velocity, provide signals utilized by the processor 50 to increase the accuracy of the automatic steering system.

If the number of steps reported by the motor encoder to the processor 50 outside a range expected by the processor, the system assumes the operator wants control and turns off power to the stepper motor 40. Also, if the encoder determines there is steering wheel movement when no change in position was requested by the processor, the power to the motor 40 is interrupted.

An adapter bracket 80 (80' in FIG. 4) connects the motor 40 to the steering column 22 or other convenient location adjacent the upper end of the steering shaft 20. The bracket 80 includes a U-clamp 82 secured to the column 22 and having an arm support 84 pivotally connected to ends of a pair of arms 86. A second pair of arms 88 is pivotally connected to opposite ends of the arms 86 and supports a motor mount 90. The stepper motor 40 is bolted to the mount 90 and includes a drive shaft 94 which receives the pulley 44. The pulley structure 34 is supported for rotation on the mount 90 by insert and bearing structure 100 secured by bolts 104 and snap ring 106. A replaceable insert 110 is captured within the bearing structure 100 for rotation together with the upper end of the shaft 20 and the pulley 34. The insert 110 has an inner configuration 112 adapted to be received on the splined or keyed end of the steering shaft 20 for the particular vehicle being converted for automatic steering. A cover 118 is secured to the mount 90 and generally encloses the pulley structures 34 and 44. The structure 32 can be easily positioned by selectively locating the clamp 82 and pivoting the arms 86 and 88. Once the structure 32 is properly positioned with the insert 110 over the steering shaft 20, the linkage 80 can be anchored to a fixed surface to prevent rotation of the motor assembly.

Figure 3:
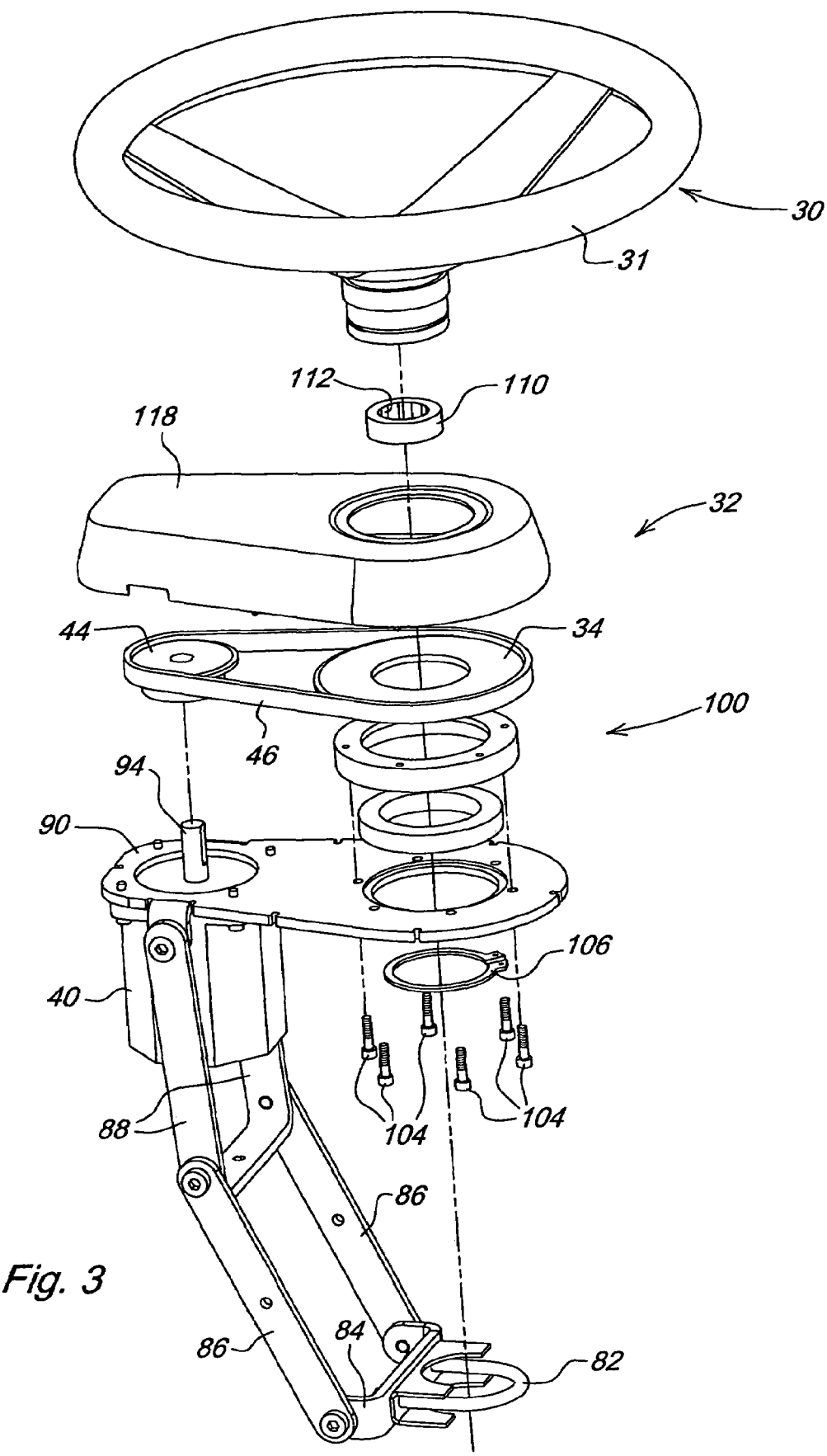
FIG. 3 is an exploded view of the steering structure of FIG. 2.
Figure 4:
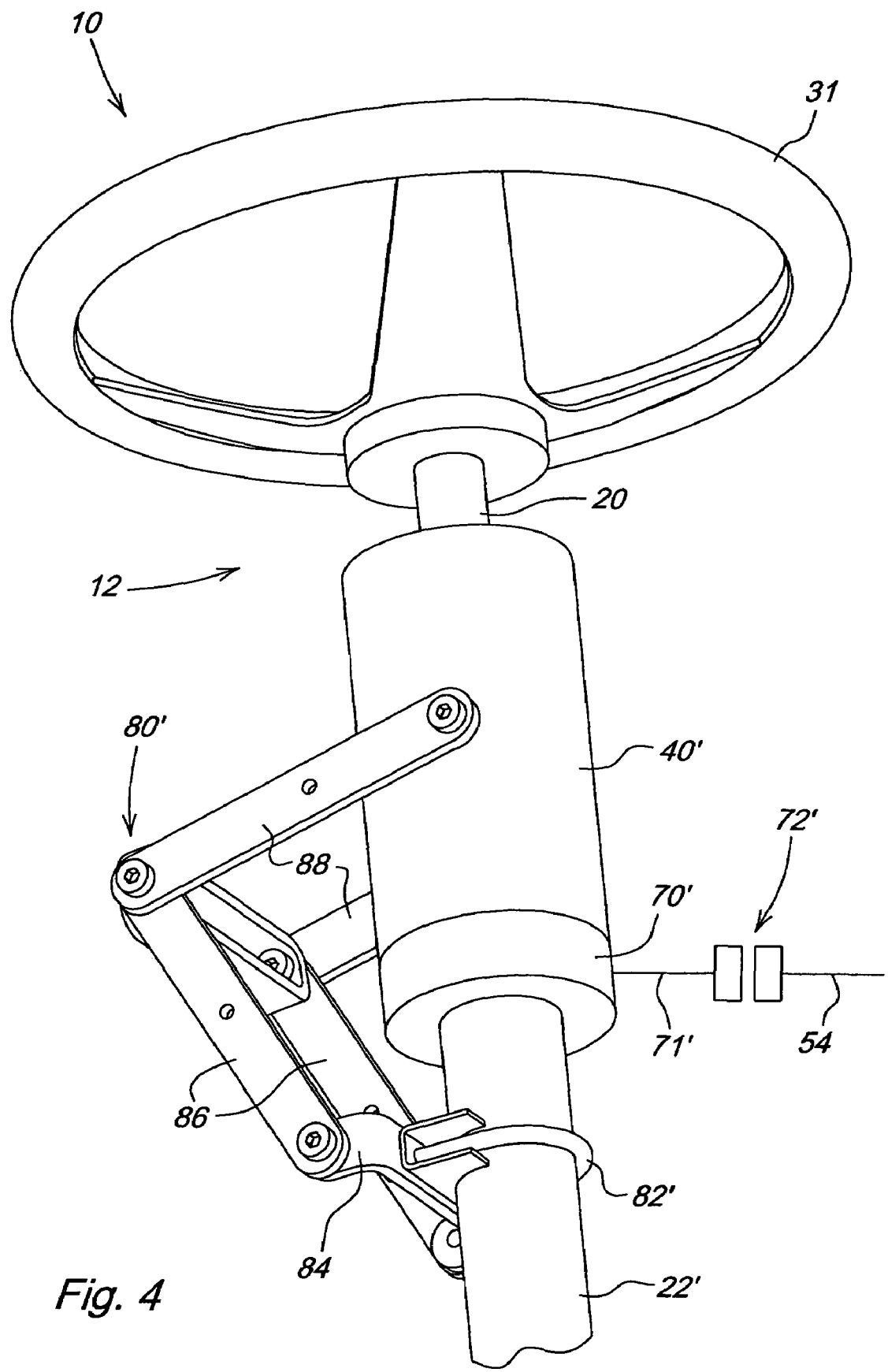
FIG. 4 is a side perspective view of an alternate embodiment showing a steering motor connected directly to the steering shaft.

In the embodiment shown in FIG. 4, the steering shaft 20 projects through the motor 40'. The motor drive can include a replaceable insert generally of the type shown at 110 in FIG. 3 to accommodate different shaft configurations. Different types and configurations of motors 40' including flatter, axially compact motors can be utilized. As illustrated in FIG. 4, the SSU 70' can be incorporated directly into the motor with the encoder and CAN harness 71' connected at 72' into the CAN harness 54, thereby minimizes the amount of hardware necessary for a conversion.

Having described the preferred embodiment, it will become apparent that various modifications can be made without departing from the scope of the invention as defined in the accompanying claims.

The invention claimed is:

1. A steering system having manual and automatic steering modes for selectively steering steerable wheels of an off-road vehicle utilizing a guidance signal from a location remote from the vehicle, the steering system comprising:
   a manual steering input for operator movement of the steerable wheels in the manual mode, the manual steering input including a hand grip portion connected to a rotatable shaft for movement with the shaft in both the manual and automatic steering modes;
   a motor;
   pulley structure connected to the shaft at a location offset from the hand grip portion;
   a drive connecting the motor to the pulley structure; and
   a processor connected to the motor and responsive to the signal for activating the motor to steer the vehicle in the automatic steering mode.

2. The steering system as set forth in claim 1 wherein the processor provides a steering signal to the motor in the automatic steering mode to rotate the shaft a predetermined amount, and the processor is responsive to a deviation between the predetermined amount and actual shaft rotation to change the steering mode from the automatic mode to the manual mode.

3. The steering system as set forth in claim 1 including feedback sensor connected to the motor and responsive to rotation of the shaft by the operator to provide a manual override indication to the processor in the automatic steering mode.

4. The steering system as set forth in claim 3 wherein the motor comprises a stepper motor and the feedback sensor comprises a shaft encoder on the motor.

5. The steering system as set forth in claim 1 wherein the hand control comprises a steering wheel fixed to the shaft.

6. The steering system as set forth in claim 1 wherein the motor, pulley structure and drive are supported on selectively attachable and removable steering column bracket.

7. The steering system as set forth in claim 6 wherein the hand grip portion is rotatably mounted on the removable steering column bracket.

8. The steering system as set forth in claim 1 wherein the pulley structure comprises an insert member, the insert member being replaceable for mounting of the pulley structure on different rotatable shaft configurations.

9. The steering system as set forth in claim 1 wherein the pulley structure comprises one of the following: a belted drive and a chain drive.

10. Conversion structure for converting an off-road vehicle from a manual steering mode to an automatic steering mode, the vehicle having a steering column with a steering wheel supported on a rotatable steering shaft, the conversion structure comprising:
- a drive pulley connectible to the steering shaft at a location offset from the steering wheel for rotation with the shaft;
- a motor;
- bracket structure for drivingly connecting the drive pulley structure to the motor for movement of the motor with the steering shaft in both an automatic steering mode and a manual steering mode; and
- a processor connected to the motor and responsive to a guidance signal from a location remote from the vehicle for steering the vehicle in the automatic mode.

11. The structure as set forth in claim 10 wherein the bracket structure supports an auxiliary steering wheel, the auxiliary steering wheel replacing the first-mentioned steering wheel when the drive pulley is connected.

12. The structure as set forth in claim 11 wherein the drive pulley is supported for rotation with the auxiliary steering wheel by the bracket structure.

13. The structure as set forth in claim 10 wherein the steering shaft has an uppermost end connected to the steering wheel, and wherein the drive pulley is connected to the uppermost end to facilitate mounting of the conversion structure.

14. In a steering system having a manual steering mode for selectively steering steerable wheels of an off-road vehicle or having an automatic steering mode utilizing a guidance signal from a location remote from the vehicle, the off-road vehicle including a manual steering input connected to a linkage for operator movement of the steerable wheels in the manual mode, the manual steering input including a hand grip portion connected to the linkage for movement with the linkage in the manual steering mode, an assembly for facilitating automatic steering the vehicle in an automatic steering mode, the assembly comprising:
- steering drive motor structure;
- a drive connecting the motor structure and the linkage at a location offset from the hand grip portion;
- a processor connected to the motor for activating the motor to move the hand grip portion and steer the vehicle in the automatic steering mode;
- wherein the steering drive motor structure includes steering input position sensor providing steered angle feedback signal to the processor; and
- wherein the processor is responsive to the steered angle feedback signal and to the guidance signal to steer the vehicle.

15. The steering system as set forth in claim 14 further comprising real time kinematic (RTK) structure connected to the processor, the RTK structure providing an RTK signal, and the processor is responsive to the RTK signal to steer the vehicle in the automatic steering mode.

16. The steering system as set forth in claim 14 further including a terrain compensation sensor connected to the processor and providing a terrain signal indicative of terrain over which the vehicle passes, and the processor is responsive to the terrain signal to steer the vehicle in the automatic steering mode.

17. The steering system as set forth in claim 14 wherein the assembly is positionable over a portion of the linkage in driving relationship with the linkage.

18. The steering system as set forth in claim 17 wherein the assembly comprises a replacement steering wheel connected to a pulley member, and the motor structure comprises a stepper motor supported adjacent the pulley member in driving relationship with the pulley member in both the manual and automatic steering modes.

19. The steering system as set forth in claim 17 wherein the linkage includes a rotatable steering shaft having an uppermost end connected to the hand grip portion, and wherein the drive is connectible to the uppermost end facilitating attachment of the assembly to the linkage.

20. The steering system as set forth in claim 19 wherein the motor is mounted directly on the steering shaft.

21. The steering system as set forth in claim 14 wherein the processor is connected to a GPS system.

22. The steering system as set forth in claim 14 wherein the steering input position sensor providing the steered angle feedback is located in the motor, and further comprising a steering system unit located in the motor and selectively connectible to a controller area network (CAN) harness on the vehicle.

* * * * *